Aug. 25, 1942.                W. A. RICE                2,294,096
CULINARY DEVICE
Filed July 1, 1941
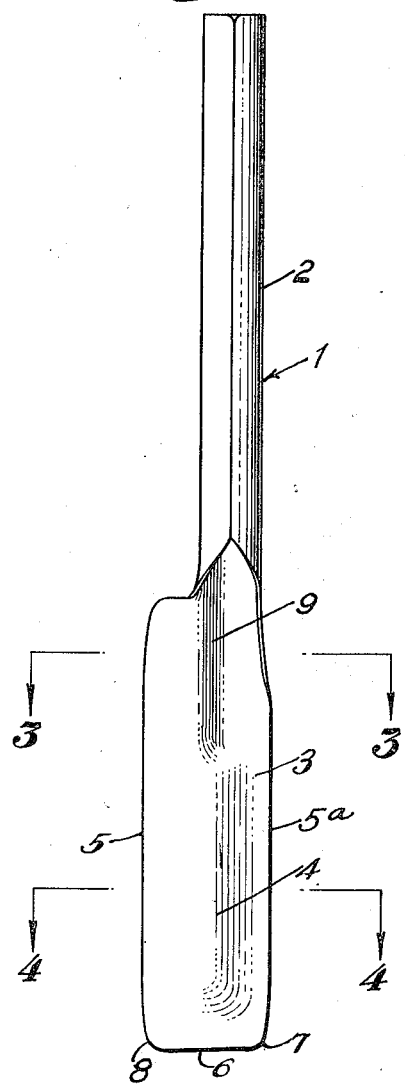
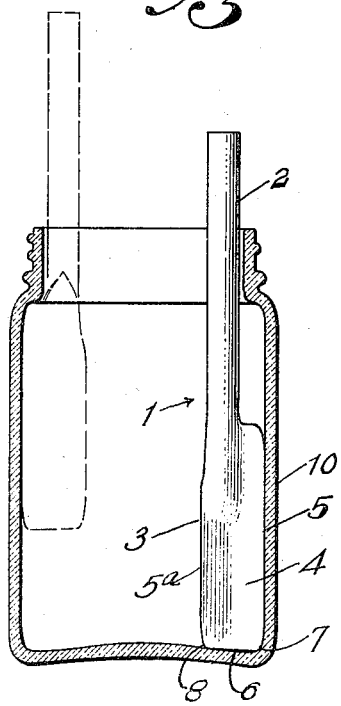
INVENTOR:
WILLIAM A. RICE;
BY Calvin Brown
ATTORNEY.

Patented Aug. 25, 1942

2,294,096

UNITED STATES PATENT OFFICE 2,294,096

CULINARY DEVICE

William A. Rice, South Pasadena, Calif.

Application July 1, 1941, Serial No. 400,625

2 Claims. (Cl. 30—165)

This invention relates to culinary devices, and in particular to a spreader.

The invention contemplates a device which is useful in the making of sandwiches, in that it may efficiently permit spreading of sandwich material, such as cheese, marmalade, butter, and the like, on bread.

At the present time, so far as the inventor is aware, the ordinary knife is unsatisfactory in that the sandwich material is not readily held upon the blade. A spoon is capable of holding a fluid mass, but the spoon does not readily permit an even spreading of the mass upon bread or like material.

An object of the present invention is the provision of a spreader which is capable in and of itself of holding material to be spread, regardless of its fluidity, and which material may be evenly spread over bread or similar substance.

The invention likewise contemplates a device which readily permits scooping or otherwise removing the contents of a container which has a neck of lesser diameter than the diameter of the body of the container.

The device of the invention is adaptable for many uses and purposes which will readily suggest themselves to any user of the device, in that the device may cut an article in addition to permitting proper spreading of material.

The invention has for further objects the provision of a device of the character stated, which is inexpensive in cost of manufacture, attractive in appearance, useful, and generally superior to devices now known to the inventor.

In the drawing:

Figure 1 is an elevation of the spreader shown within a Mason jar, said jar being shown in vertical section, Figure 2 is an enlarged plan view of the spreader, and, Figures 3 and 4 are sectional views on the lines 3—3 and 4—4 of Figure 2.

Referring to the drawing, the improved spreader is designated as an entirety by the numeral 1, and includes a handle 2, interconnected with a blade 3. The length of the blade is immaterial, although in the figures, it is shown of extended length. The blade is formed with an elongated lengthwise concavity 4, and the edge 5 and end 6 are preferably sharpened. The end 6 is substantially at right angles to the edge 5 and back 5ª, although the corners 7 and 8 may be rounded.

In forming the spreader, the handle 2 may be tubular and integral with the blade. This tubular construction results in a slight convexity 9 for a portion of the blade, as shown in Figure 3. The construction shown permits the blade and the handle to be formed from a single strip of metal, or from plastic or other material. The blade is of greater width than the width of the handle, and the handle is offset with respect to the longitudinal center of the blade. I may sharpen the back or edge 5ª of the blade, although I have found that sharpening of the edges 5 and 6 is sufficient.

The operation, uses and advantages of the invention are as follows:

If it is desired to make a sandwich, the blade may be dipped within sandwich spread to remove same from the container, the concavity 4 of the blade holding a quantity of the spread. If the spread is quite thin, it is evident that the spread will not readily escape from the blade, due to the presence of the concavity. The blade holding the spread within the concavity is placed over the article, such as a slice of bread, which is to receive the spread, the blade rotated so as to deposit the spread on the surface of the bread, whereupon the blade is used to smooth the spread over the surface of the bread by a sweeping motion of the edge 5. The bread may thereafter be cut to any desired shape through the medium of the sharp edges 5 and 6.

In the case of a Mason jar, such as shown in Figure 1 at 10, the offset handle permits the blade to be received within the jar through a neck, which may be of lesser diameter than the internal diameter of the jar body, to the end that the blade edges 5 and 6 may readily contact with the interior surface of the jar, as illustrated in both full lines and dotted lines in Figure 1. Thus, the entire content of the jar is readily removed without wastage.

In the case of the spreading of a solid material, such as refrigerated butter, the end 6 of the blade permits the butter to be readily cut and to be spread.

I claim:

1. In a culinary device, a blade having a sharpened edge, a handle offset with relation to said sharpened edge, said blade formed with an end cutting edge substantially at right angles to and in the plane of the said sharpened edge of the blade, and the portion of said blade near the handle being transversely of V-shaped formation.

2. In a culinary device, a blade and a handle extending from the heel of said blade, one side edge of said blade being offset with relation to said handle, the blade being formed with a forward squared end edge and with a flat forward end portion, and said blade being of transverse shallow V-formation between said forward end portion and said handle.

WILLIAM A. RICE.